United States Patent [19]

Blecke et al.

[11] E Re. 28,475

[45] Reissued July 8, 1975

[54] PROCESS FOR COPOLYMERIZATION OF MALEIC ANHYDRIDE WITH 1-OLEFINS

[75] Inventors: Ronald G. Blecke, Lower Salford Twp., Montgomery County; Robert W. Hill, Gibsonia, both of Pa.

[73] Assignee: Gulf Research & Development Company, Pittsburgh, Pa.

[22] Filed: Mar. 13, 1974

[21] Appl. No.: 450,822

Related U.S. Patent Documents

Reissue of:

[64] Patent No.: 3,729,451
Issued: Apr. 24, 1973
Appl. No.: 270,331
Filed: July 10, 1972

[52] U.S. Cl. ..... 260/78.5 R; 260/875; 260/878; 260/886

[51] Int. Cl.[2]... C08F 2/02; C08F 2/08; C08F 222/06

[58] Field of Search ..... 260/78.5 R

[56] References Cited

UNITED STATES PATENTS

| | | | |
|---|---|---|---|
| 3,249,454 | 5/1966 | Williams | 106/309 |
| 3,461,108 | 8/1969 | Heilman et al. | 260/78.5 |
| 3,553,183 | 1/1971 | Field et al. | 260/78.5 |
| 3,560,456 | 2/1971 | Hazen et al. | 260/78.5 |

*Primary Examiner*—Joseph L. Schofer
*Assistant Examiner*—John Kight

[57] ABSTRACT

Maleic anhydride and polymerizable liquid 1-olefins having from 4 to 14 carbon atoms are copolymerized employing a liquid-liquid dispersion as the reaction mixture by use of excess liquid 1-olefin as a diluent and a minor amount of a copolymer of maleic anhydride with an aliphatic 1-olefin having from 14 to 18 carbon atoms as a dispersing agent. Maleic anhydride and a polymerization initiator becomes dispersed in the mixture of olefin and dispersing agent and polymerization takes place when the temperature is raised to about 80° C. with agitation.

6 Claims, No Drawings

PROCESS FOR COPOLYMERIZATION OF MALEIC ANHYDRIDE WITH 1-OLEFINS

Matter enclosed in heavy brackets [ ] appears in the original patent but forms no part of this reissue specification; matter printed in italics indicates the additions made by reissue.

DESCRIPTION OF THE INVENTION

The preparation of copolymers of maleic anhydride with various unsaturated monomers, particularly ethylene and styrene is well known in the art. More recently, copolymers of maleic anhydride with various branched and linear aliphatic 1-olefins have been prepared, some of which are finding uses in industry. It has been found however, that in the preparation of a copolymer of maleic anhydride and such 1-olefins that the recovery of the copolymers presents some fairly difficult problems. The use of an excess of olefin in solution polymerization processes so as to obtain more complete reaction increases the difficulty of separating the product.

A satisfactory practice which has been used as disclosed for example, in U.S. Pat. 3,461,108, is to employ certain efficient solvents for the polymerization step, keeping the monomers and in some instances the polymers also in solution during the polymerization, and then adding to the resulting solution another liquid, which causes precipitation of the polymer products in finely divided filterable solid form. The selection of the combination of reaction solvent and precipitating solvent is critical. A very limited choice of solvent combinations exists, no completely satisfactory precipitating agent having been found for some copolymers. Furthermore, the solvents are expensive and for this reason must be separated and recovered. The solvent separation, polymer filtration and washing steps require bulky equipment and are time consuming.

It has been found in accordance with the present invention that copolymers of maleic anhydride with a variety of polymerizable 1-olefins having from 4 to 14 carbon atoms can be produced in the form of dispersions of solid particles in excess 1-olefin as a diluent, provided there is employed as dispersing agent an equimolecular copolymer of maleic anhydride with an aliphatic 1-olefin having from 14 to 18 carbon atoms and the reaction mixture is heated to the vicinity of 80° C. with agitation to generate a liquid-liquid dispersion as a polymerization reaction mixture.

Briefly, the present invention consists of a liquid dispersion process for manufacturing a copolymer of maleic anhydride with an aliphatic 1-olefin comprising the steps:

a. forming a reaction mixture by mixing together at least one polymerizable liquid 1-olefin having from 4 to 14 carbon atoms, a minor amount of an equimolecular copolymer of maleic anhydride with an aliphatic 1-olefin having from 14 to 18 carbon atoms as a dispersing agent, a polymerization initiator and a quantity of maleic anhydride which is less than a molar equivalent of the amount of 1-olefin present, b. agitating the reaction mixture of step (a) and heating to increase the temperature to the point at which the reaction mixture becomes a liquid-liquid dispersion and the polymerization reaction is initiated, c. continuing agitation of the reaction mixture at a temperature near the decomposition temperature of the polymerization initiator until a dispersion of solid copolymer particles in liquid 1-olefin is obtained as a polymerization product mixture, and d. recovering the solid particles of product from the polymerization product mixture by filtration or vaporization of the liquid 1-olefin.

The procedure outlined above eliminates the usual precipitation step in solution polymerization which requires costly separation of solvent and precipitant when recycled, yields a liquid-liquid dispersion type of reaction mixture which has a low viscosity and is easily stirred, pumped and handled and permits operation at higher solids content in the product mixture. This results in greater throughput capacity and lower process costs for equipment of a size comparable to that employed in solution polymerization. The dispersion copolymerization process of this invention is characterized by a combination of features which include the use of a 1-olefin comonomer as the dispersing medium, a unique dispersing agent and a temperature program which allows the dispersion to develop. The process is discussed in greater detail below.

In carrying out the process there are some critical features which must be taken into account. One of the most critical features is selection of the polymeric dispersing agent. Only the copolymers of the maleic anhydride with the higher 1-olefin appear to have good dispersion efficiency. Equimolecular copolymers of maleic anhydride with 14 to 18 carbon 1-olefins may be used for the purpose, preferably at a concentration of 1 to 2 weight percent. The copolymers, which may be made by published methods, for example the method of U.S. Pat. 3,560,456, are characterized in the following discussion.

The dispersing agents employed in the method of this invention are linear, low molecular weight copolymers of straight chain 1-olefins and maleic anhydride. The olefin and maleic anhydride are present in a 1:1 molar ratio, as shown in the following structural formula. R represents a linear alkyl substituent, the length of which is determined by the choice of the olefin comonomer. In the tetradecene copolymer, for example, the R substituent is dodecyl.

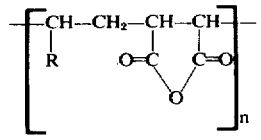

The copolymer dispersing agents are white solids with melting ranges which center from about 117° C. (1-octadecene copolymer) to about 129° C. (1-tetradecene copolymer). Typical physical properties are summarized below:

| Property | 1-tetradecene copolymer | 1-octadecene copolymer |
|---|---|---|
| Melting range, °C | 124–133 | 115–119 |
| Equivalent acid value [1] | 382 | 321 |
| Specific gravity [2] | 1.036 | 0.973 |

-Continued

| Property | 1-tetra-decene copolymer | 1-octa-decene copolymer |
|---|---|---|
| Inherent viscosity [3] | 0.147 | 0.144 |

[1] Theoretical values, ignoring end group effect.
[2] True density.
[3] 5.0 g./dl. in methyl isobutyl ketone at 77° F.

The copolymer dispersing agents are soluble in a wide variety of organic solvents, as shown below. The solubility of these copolymers in hydrocarbon solvents is a unique characteristic, not shared by copolymers of maleic anhydride with lower 1-olefins.

SOLUBILITY OF COPOLYMER DISPERSING AGENTS

| | 1-tetra-decene copolymer | 1-Octa-decene copolymer |
|---|---|---|
| Chlorinated solvents: | | |
| Carbon tetrachloride | S | S |
| 1,2-dichloroethane | S | S |
| Esters: Ethylacetate | S | S |
| Hydrocarbons: | | |
| Benzene | S | S |
| Ligroin | SIS | S |
| Decalin | SIS | S |
| Ketones: | | |
| Acetone | S | S |
| Methyl isobutyl ketone | S | S |
| Ethers: Bis(2-methoxyethyl)ether | S | S |

Note.-S=soluble; >5 g./100 ml. SIS=slightly soluble; 1-5 g./100 ml.

In carrying on the heating program it is desirable to have the solid maleic anhydride entirely mixed with liquid prior to raising the temperature to the melting point of the maleic anhydride. The temperature should be increased slowly enough so that the mixing or stirring device employed in the reactor is able to maintain a condition of efficient mixing during the rise in temperature. If raising the temperature to the decomposition temperature of the initiator is carried out too quickly, without efficient stirring, polymer may adhere to the walls of the reactor. Although the process will operate and a polymer dispersion does form, the solid coating of polymer on the wall of the reactor will necessitate a cleaning operation. The speed with which the temperature can be raised to the decomposition temperature of the initiator depends to a great extent upon the efficiency of the mixing apparatus in the reactor. This is largely a matter of choice from among the many types of mixing devices which are now available. A compromise will have to be reached between mixing speed, power consumption, residence time in the reactor and various cost factors.

Selection of the polymerization initiator is made mainly on the basis of the decomposition temperature at which the compound produces free radicals. This temperature should be above the melting point of maleic anhydride but below the softening temperature of the copolymer product. Peroxide initiators such as di-tert.butyl peroxide and benzoyl peroxide and azobisisobutyronitrile are among those initiators which are available commercially.

Unlike the dispersing agents, the choice of polymerizable 1-olefin is not critical. Pure compounds or mixtures may be used in which there is a polymerizable vinyl group. The balance of the molecule may be straight chain, branched or cyclic in structure, including vinyl aromatic monomers such as styrene.

The polymer products obtained by the present process may be used for all the purposes to which corresponding products have been used in the past and have no observable deficiencies in chemical or physical properties. The solid particles of polymer obtained by this technique appear to have a very desirable physical structure, which render them easily handled in conventional processing equipment. The operation of the process is illustrated by the following specific examples.

EXAMPLE 1

To 2.5 moles of 1-hexene there is added 1.8 g. of tert-.butyl peroctoate as a polymerization initiator and 2.8 g. of an 1-octadecene-maleic anhydride copolymer as a dispersing agent and 1 mole of solid maleic anhydride. The mixture is then heated with stirring. As the temperature rises above the melting point of the maleic anhydride (53° C.) the anhydride forms a second liquid phase underneath the liquid hexane. There is little tendency of the two liquid phases to intermix, even with vigorous agitation, until the temperature reaches the vicinity of 80° C. and then only when the unique dispersing agent is present in the mixture. When the two liquid phases begin to intermix and form a liquid-liquid dispersion there is evidence that the copolymerization reaction has begun. With continued stirring for a sufficient time period at a temperature of about 80° C. the polymerization procedure yields a dispersion of solid copolymer particles in the excess liquid 1-hexene employed as a diluent. When the polymerization reaction is judged to be complete, the excess olefin employed as a liquid reaction diluent is separated from the polymer by evaporation or filtration, yielding finely divided non-tacky, solid copolymer.

EXAMPLE 2

The procedure employed in this specific example is essentially the same as described in Example 1. The reaction vessel is charged with 29.4 g. (0.3 mole) of maleic anhydride, 250 ml. of 1-hexene, 2.0 g. of benzoyl peroxide, and 2 g. of maleic anhydride-1-octadecene copolymer. The temperature profile from 60° C. to 90° C. requires one hour. The dispersion develops normally and the reaction is allowed to proceed at 90° C. for an additional 5 hours. A powdery white solid, M.P. 136–140° C. is isolated in 96% yield after filtration and drying. The copolymer has a solution viscosity of 0.10 dl./g.

EXAMPLE 3

The procedure and apparatus employed in this example was the same as described in Example 1. The reaction vessel was charged with 29.4 g. (0.3 mole) of maleic anhydride, 250 ml. of 1-hexene, 2.0 ml. of tert.butyl peroctoate, and 2 g. of maleic anhydride-1-tetradecene copolymer. The temperature profile from 60–80° C. required one hour and the reaction was allowed to proceed for 2 hours at 86° C. Filtration and drying as before gave a white solid, M.P. 142–160° C., in 85% yield. The copolymer had a solution viscosity of 0.13 dl./g.

EXAMPLE 4

The procedure and apparatus employed in this example were the same as described in Example 1. The reaction vessel was charged with 29.4 g. (0.3 mole) of maleic anhydride, 250 ml. of 1-decene, 2.0 ml. of tert.butyl peroctoate, and 2 g. of maleic anhydride-1-octadecene copolymer. The temperature profile from 60–90° C. was slower as the dispersion developed slowly. The resultant dispersion after filtration gave a white granular solid, M.P. 105–113° C.

EXAMPLES 5 and 6

Two batches of polymer were manufactured in a 50-gallon pilot plant reactor using the dispersion copolymerization procedure. The reaction charge for the two batches was:

| | | |
|---|---|---|
| 1-hexene | lbs | 193 |
| Maleic anhydride | lbs | 67 |
| Tert.butyl peroctoate | cc | 520 |
| Maleic anhydride - 1 - octadecene copolymer dispersant | lbs | 2.3 |

Each batch was heated to 194° F. (90° C.), held two hours and cooled. The excess hexene was evaporated from the product using a Patterson-Kelly rotary vacuum dryer. Dried product was passed through a ¼ inch screen. The quantities of products of two batches and their properties are tabulated below.

PILOT PLANT SYNTHESIS OF 1-HEXENE COPOLYMER

| Example | 5 | 6 |
|---|---|---|
| Crude product, lbs | 123 | 123 |
| Reaction yield, percent | 97.0 | 97.0 |
| Dried product, lbs. | 114 | 113 |
| Overall yield, percent | 89.9 | 89.1 |
| Inherent viscosity, dl./g | 0.161 | 0.169 |
| Volatiles, percent | 0.6 | 0.6 |

We claim:

1. A dispersion process for manufacturing a copolymer of maleic anhydride with an aliphatic 1-olefin comprising the steps:
   a. forming a reaction mixture by mixing together at least one polymerizable liquid 1-olefin having from 4 to 14 carbon atoms, a minor amount of an equimolecular copolymer of maleic anhydride with a linear aliphatic 1-olefin having from 14 to 18 carbon atoms as a dispersing agent, a polymerization initiator and a quantity of maleic anhydride which is less than a molar equivalent of the amount of 1-olefin present,
   b. agitating the reaction mixture of step (a) and heating to increase the temperature to the point at which the polymerization reaction is initiated,
   c. continuing agitation of the reaction mixture at a temperature near the decomposition temperature of the polymerization initiator until a dispersion of solid copolymer particles in liquid 1-olefin is obtained as a polymerization product mixture, and
   d. recovering the solid particles of product from the polymerization product mixture by filtration or evaporation of the liquid 1-olefin.

2. A dispersion process for manufacturing a copolymer of maleic anhydride with 1-hexene consisting essentially of the steps:
   a. forming a reaction mixture by mixing together 1-hexene, a minor amount, between 1 and 2 weight percent concentration, of an equimolar copolymer of maleic anhydride with a linear aliphatic 1-olefin having from 14 to 18 carbon atoms as a dispersing agent, a polymerization initiator and a quantity of maleic anhydride which is less than a molar equivalent of the amount of 1-hexene present,
   b. agitating the reaction mixture of step (a) and heating to increase the temperature to the point at which the polymerization reaction is initiated,
   c. continuing agitation of the reaction mixture at a temperature near the decomposition temperature of the polymerization initiator until a dispersion of solid copolymer particles in liquid 1-hexene is obtained as a polymerization product mixture, and
   d. recovering the solid particles of product from the polymerization product mixture by filtration or vaporization of the liquid 1-hexene.

3. A dispersion process for manufacturing a copolymer of maleic anhydride with 1-decene consisting essentially of the steps:
   a. forming a reaction mixture by mixing together 1-decene, a minor amount, between 1 and 2 weight percent concentration, of an equimolecular copolymer of maleic anhydride with a linear aliphatic 1-olefin having from 14 to 18 carbon atoms as a dispersing agent, a polymerization initiator and a quantity of maleic anhydride which is less than a molar equivalent of the amount of 1-decene present,
   b. agitating the reaction mixture of step (a) and heating to increase the temperature to the point at which the polymerization reaction is initiated,
   c. continuing agitation of the reaction mixture at a temperature near the decomposition temperature of the polymerization initiator until a dispersion of solid copolymer particles in liquid 1-decene is obtained as a polymerization product mixture, and
   d. recovering the solid particles of product from the polymerization product mixture by filtration or vaporization of the liquid 1-decene.

*4. A dispersion process for manufacturing a copolymer of maleic anhydride with 1-hexene consisting essentially of the steps:*
   *a. forming a reaction mixture by mixing together at least one polymerizable liquid 1-olefin having from 4 to 14 carbon atoms, a minor amount of an equimolecular copolymer of maleic anhydride with a linear aliphatic 1-olefin having from 14 to 18 carbon atoms as a dispersing agent, a polymerization initiator and a quantity of maleic anhydride which is less than a molar equivalent of the amount of 1-olefin present,*
   *b. agitating the reaction mixture of step (a) and heating to increase the temperature to the point at which the polymerization reaction is initiated, and*
   *c. continuing agitation of the reaction mixture at a temperature near the decomposition temperature of the polymerization initiator until a dispersion of solid copolymer particles in liquid 1-olefin is obtained as a polymerization product mixture.*

*5. A dispersion process for manufacturing a copolymer of maleic anhydride with 1-hexene consisting essentially of the steps:*
   *a. forming a reaction mixture by mixing together 1-hexene, a minor amount, between 1 and 2 weight percent concentration, of an equimolecular copolymer of maleic anhydride with a linear aliphatic 1-olefin having from 14 to 18 carbon atoms as a dispersing agent, a polymerization initiator and a quan-*

*tity of maleic anhydride which is less than a molar equivalent of the amount of 1-hexene present,*

*b. agitating the reaction mixture of step (a) and heating to increase the temperature to the point at which the polymerization reaction is initiated, and*

*c. continuing agitation of the reaction mixture at a temperature near the decomposition temperature of the polymerization initiator until a dispersion of solid copolymer particles in liquid 1-hexene is obtained as a polymerization product mixture.*

*6. A dispersion process for manufacturing a copolymer of maleic anhydride with 1-decene consisting essentially of the steps:*

*a. forming a reaction mixture by mixing together 1-decene, a minor amount, between 1 and 2 weight*

*percent concentration, of an equimolecular copolymer of maleic anhydride with a linear aliphatic 1-olefin having from 14 to 18 carbon atoms as a dispersing agent, a polymerization initiator and a quantity of maleic anhydride which is less than a molar equivalent of the amount of 1-decene present,*

*b. agitating the reaction mixture of step (a) and heating to increase the temperature to the point at which the polymerization reaction is initiated, and*

*c. continuing agitation of the reaction mixture at a temperature near the decomposition temperature of the polymerization initiator until a dispersion of solid copolymer particles in liquid 1-decene is obtained as a polymerization product mixture.*

* * * * *

UNITED STATES PATENT OFFICE

CERTIFICATE OF CORRECTION

PATENT NO. Re. 28,475

DATED July 8, 1975

INVENTOR(S) Ronald G. Blecke, Robert W. Hill

It is certified that error appears in the above-identified patent and that said Letters Patent are hereby corrected as shown below.

COL. 4, line 21, "hexane" should read --hexene--.

COL. 5, line 67, "equimolar" should read --equimolecular--.

COL. 6, lines 41 & 42, "1-hexene consisting essentially of" should read --an aliphatic 1-olefin comprising--.

Signed and Sealed this

*eighteenth* Day of *November 1975*

[SEAL]

*Attest:*

RUTH C. MASON
*Attesting Officer*

C. MARSHALL DANN
*Commissioner of Patents and Trademarks*